United States Patent Office 2,860,161
Patented Nov. 11, 1958

2,860,161

HEXACHLOROBICYCLOHEPTENYL BENZENE-SULFONIC ACID

Louis Schmerling and John P. Luvisi, Riverside, Ill., assignors to Universal Oil Products Company, Des Plaines, Ill., a corporation of Delaware No Drawing. Application September 28, 1955
Serial No. 537,280

2 Claims. (Cl. 260—505)

This invention relates to water-soluble, surface-active, insecticides and a method of preparing the same.

An object of this invention is to prepare novel compositions of matter which may be used as insecticides.

A further object of this invention is to prepare water-soluble, surface-active, polyhalogenated compounds which may be utilized as insecticides.

One embodiment of this invention is found in a process for preparing a sulfonated aryl polyhalobicyclo compound by reacting a polyhalocycloalkadiene with an arylalkene, sulfonating the resultant product with a suitable sulfonating agent, and recovering the resultant sulfonated aryl polyhalobicyclo compound.

Another embodiment of this invention resides in a process for preparing a sulfonated aryl hexachlorobicyclo compound by reacting hexachlorocyclopentadiene with an arylalkene at a temperature in the range of from about 80° to about 200° C., sulfonating the resultant product with concentrated sulfuric acid at a temperature in the range of from about 0° to about 100° C., and recovering the resultant sulfonated aryl hexachlorobicyclo compound.

A specific embodiment of the invention resides in a process for preparing the sodium salt of p-(1,4,5,6,7,7-hexachlorobicyclo[2.2.1] - 5-hepten-2-yl)benzenesulfonic acid by reacting hexachlorocyclopentadiene with styrene at a temperature in the range of from about 80° to about 200° C., sulfonating the resultant 1,2,3,4,7,7-hexachloro-5-phenylbicyclo[2.2.1]-2-heptene with oleum in the presence of n-butane at a temperature in the range of from about 0° to about 100° C., recovering the resultant p - (1,4,5,6,7,7 - hexachlorobicyclo[2.2.1] - 5 - hepten-2-yl)benzenesulfonic acid, and neutralizing said compound with sodium hydroxide to obtain the sodium salt thereof.

Another specific embodiment of the invention resides in a new composition of matter comprising the sodium salt of (1,4,5,6,7,7-hexachlorobicyclo[2.2.1]-5-hepten-2-yl)benzenesulfonic acid.

Other objects and embodiments referring to alternative aryl compounds and to alternative polyhalocycloalkadienes which may be used will be found in the following further detailed description of this invention.

It has now been discovered that insecticidal compositions may be prepared which are soluble in water and are surface-active agents. Advantages which may be found in having a water soluble insecticide is the elimination of the need of an emulsifying agent when preparing an aqueous solution of the insecticide, as well as a reduction in the cost of the preparation of said solution. Furthermore, the solutions are surface-active and when used in detergent formulations yield clean surfaces which are insecticidal. These compounds are prepared by sulfonating the adduct of a polyhalocycloalkadiene and an arylalkene, said sulfonation being followed by neutralization of the sulfonic acid with an alkaline compound and recovering the resultant salt of the polyhalobicycloalkenyl aryl sulfonic acid.

Polyhalocycloalkadienes which may be used in this invention include polyhalo substituted 1,3-cyclopentadiene, hereinafter referred to as "cyclopentadiene," such as dichlorocyclopentadiene, dibromocyclopentadiene, difluorocyclopentadiene, trichlorocyclopentadiene, tribromocyclopentadiene, trifluorocyclopentadiene, tetrachlorocyclopentadiene, tetrabromocyclopentadiene, tetrafluorocyclopentadiene, pentachlorocyclopentadiene, pentabromocyclopentadiene, pentafluorocyclopentadiene, hexachlorocyclopentadiene, hexabromocyclopentadiene, hexafluorocyclopentadiene, chlorobromocyclopentadiene, dichlorobromocyclopentadiene, trichlorobromocyclopentadiene, etc., chlorodibromocyclopentadiene, chlorotribromocyclopentadiene, etc., dichloro - 1,3 - cyclohexadiene, dibromo-1,3-cyclohexadiene, difluoro - 1,3 - cyclohexadiene, trichloro-1,3 - cyclohexadiene, tribromo - 1,3 - cyclohexadiene, trifluoro - 1,3 - cyclohexadiene, tetrachloro - 1,3 - cyclohexadiene, tetrabromo - 1,3 - cyclohexadiene, tetrafluoro-1,3-cyclohexadiene, pentachloro - 1,3 - cyclohexadiene, pentabromo - 1,3 - cyclohexadiene, pentafluoro - 1,3 - cyclohexadiene, hexachloro - 1,3 - cyclohexadiene, hexabromo-1,3 - cyclohexadiene, hexafluoro - 1,3 - cyclohexadiene, heptachloro - 1,3 - cyclohexadiene, heptabromo-1,3-cyclohexadiene, heptafluoro - 1,3 - cyclohexadiene, octachloro-1,3 - cyclohexadiene, octabromo-1,3-cyclohexadiene, octafluoro-1,3-cyclohexadiene, etc.

Arylalkenes which are capable of reacting with the polyhaloalkadiene in this process include styrene, allylbenzene, propenylbenzene, phenylbutenes, phenylisobutylenes, etc., vinylnaphthalenes, allylnaphthylenes, propenylnaphthylenes, etc. It is understood that the abovementioned arylalkene compounds are only representatives of compounds which may be used in the process of the present invention and that said process is not necessarily limited thereto.

The process of this invention may be effected in any suitable manner and may comprise either a batch or continuous type operation. When a batch type operation is used a quantity of the starting materials, namely, the arylalkene and the polyhaloalkadiene are heated in an appropriate condensation apparatus, sometimes in the presence of an organic solvent, at an elevated temperature for a predetermined time. Suitable temperatures are in the range of from about 30° C. to about 250° C., the preferred range being from about 80° C. to about 200° C. At the end of the reaction time the flask and contents thereof are allowed to cool to room temperature and the adduct separated from any unreacted starting materials.

The sulfonation of the adduct is then accomplished by reacting the adduct with a suitable sulfonating agent such as concentrated sulfuric acid, oleum containing free sulfur trioxide (for example, an oleum containing 30% free sulfur trioxide), sulfur trioxide itself, etc. Depending upon the particular adduct employed in the presence of the sulfonation reaction and the strength of the sulfonating agent, the sulfonation is effected in temperatures ranging from about 0° to about 100° C. In addition the sulfonation may be carried out in the presence of a liquid inert diluent which may be a low boiling point substance maintained in liquid phase by regulation of the ambient pressure and which may be allowed to evaporate at a selected temperature to provide evaporation cooling in the reaction mixture, inasmuch as the heat liberated by the exothermic sulfonation reaction tends to increase the temperature above the desired previously determined maximum limitation.

Other advantages of the presence of the inert diluent within the sulfonation reaction mixture is the resulting reduction in the viscosity of the mixture, thereby making it more readily transferable from reactor to reactor or to successive stages of the process and eliminating local high temperature zones in the reaction mixture by virtue of the resulting reduction in viscosity. In the absence of the diluent, the said high temperature zones in the highly viscous, static portions of the reaction mixture tend to develop, which, if not rapidly dissipated, produce undesirable discoloration of the product and in other respects results in a product of lower surface activity. Typical inert liquids utilizable in the sulfonation reaction as diluents include the liquified paraffinic hydrocarbons, examples of said saturated paraffinic hydrocarbons including n-butane, pentane, hexane, etc. In addition other paraffinic hydrocarbons such as cyclopentane, cyclohexane, etc., may also be used. The quantity of the inert diluent introduced into the sulfonation reaction mixture, usually in admixture with the adduct is preferably maintained in the sulfonation zone within the range of from about 0.5 to about 10 volumes per portion of the adduct charging stock. The ratio of reactants, that is, the sulfonation agent to the adduct originally charged into the sulfonation reaction is dependent, for the most part, upon the type of sulfonating agent used. For example, when utilizing oleum containing about 30% free sulfur trioxide, the corresponding molar ratio of reactants is from about 2.0 to about 6.0 moles of the total sulfur trioxide (calculated upon the bases of free and combined sulfur trioxide, the latter being present as sulfuric acid) per mole of adduct charging stock.

Upon completion of the sulfonation reaction, the reaction mixture is allowed to settle and water is added to the mixture. The inert diluent is allowed to evaporate, after which the sulfonated adduct is further treated with water and neutralized by the addition of a base such as an alkali metal hydroxide, said hydroxides including sodium and potassium hydroxides; alkaline earth metal hydroxides such as calcium and magnesium hydroxide; or ammonia, etc.

Another process in which the preparation of the insecticide of the present invention may be accomplished is of the continuous type. In this operation the arylalkene and the polyhalocycloalkadiene are continuously introduced to a reactor maintained at the proper operating conditions of temperature and pressure. The reactor may comprise an unlined vessel or coil or may contain an adsorbent packing material such as fire brick, alumina, dehydrated bauxite and the like. After the residence time has been completed the adduct formed in the reactor is continuously withdrawn and charged to a second reactor for the sulfonation process. The sulfonating agent which may comprise oleum, is also continuously charged to the second reactor which is also maintained at the proper operating conditions of temperature and pressure. In addition, if so desired, the inert diluent may be admixed with the stream of adduct coming from the first reactor prior to being charged into the second reactor. The sulfonated adduct is then continuously withdrawn from the second reactor and, if so desired, charged to a third reactor where it may undergo neutralization with a base hereinbefore described.

Examples of insecticides which may be prepared according to the process of this invention and which comprises new compositions of matter include p-(1,4,5,6,7,7-hexachlorobicyclo[2.2.1] - 5 - hepten - 2 - yl)benzenesulfonic acid, (1,4,5,6,7,7-hexachlorobicyclo[2.2.1]-5-hepten-2-yl)toluenesulfonic acids, (1,4,5,6,7,7-hexachlorobicyclo[2.2.1] - 5 - hepten - 2 - ylmethyl)benzenesulfonic acid, (1,4,5,6,7,7 - hexachlorobicyclo[2.2.1] - 5 - hepten-2-yl)naphthalenesulfonic acids, and sodium and potassium salts of the above mentioned acids.

The volatility of the insecticides produced according to this invention is usually dependent upon its molecular weight and when a product having low volatility is especially desired in a particular application, such as a high degree of retentivity or activity to which the pesticide is applied, advantage may be taken of the fact that the products of the first step of the present invention having a relatively high molecular weight also possess relatively higher boiling points than do the products having low molecular weights, and thus may be the preferred reactants for the production of such composition.

The physical properties of the present polyhalobicycloaryl sulfonic acids and their alkaline salts, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison of the insect. The insecticides comprising the compounds of the present invention are thus effective against chewing as well as sucking types of insects. In addition, the compounds are sufficiently volatile so that when applied to plant life intended to substantiate human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticide of the present invention may be combined with water or other diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice for the most desirable concentration and also whether or not the insecticide is dissolved in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquified into a small bomb containing the insecticide which, upon release of pressure therefrom, vaporizes the liquid and suspends a quantity of the active component therein, thus providing a convenient spraying method of applying the insecticide. The present invention is illustrated with respect to specific embodiments thereof in the following examples which, however, are not intended to limit the generally broad scope of the present invention in strict accordance therewith.

*Example I*

A mixture of one mole of hexachlorocyclopentadiene and one mole of styrene in a toluene solution was heated under reflux at a temperature of about 120° C. for a period of approximately 9 hours. At the end of this time the flask and contents thereof were allowed to cool to room temperature and the reaction product separated from the unreacted starting materials and subjected to fractional distillation under reduced pressure. The material boiling at 170–173° C. at 2.5 mm. pressure was separated. The cut, a crystalline material comprising 1,2,3,4,7,7 - hexachloro-5-phenylbicyclo[2.2.1]-2-heptene, had a melting point of about 75° C.

32 g. of the crystalline hexachlorophenylbicycloheptene and 110 cc. of n-butane were admixed in a condensation flask and 20 g. of 65% oleum was slowly added with continuous stirring for about 1 hour, the temperature of the flask being maintained at approximately 2° C. At the end of this time 4 g. of water was added and the n-butane allowed to evaporate. The contents of the flask were extracted with n-pentane and the pentane allowed to evaporate. The pentane insoluble product was treated with water and the water solution thereafter neutralized with sodium hydroxide and evaporated, 43 g. of brown solid was recovered. The solid was then dried in an oven at approximately 100° C. and thereafter extracted in a Soxhlet extractor for 7.5 hours with absolute ethyl alcohol. 22 g. of material remained in the thimble after the extraction. The ethyl alcohol extract was evaporated to dryness yielding 13 g. of a white plastic solid which comprised the sodium salt of p-(1,4,5,6,7,7-hexachlorobicyclo[2.2.1]-5-hepten-2-yl)benzenesulfonic acid.

The sodium salt of the benzene sulfonic acid was found to be soluble in water yielding a solution which gave suds upon shaking.

*Example II*

A solution was prepared by dissolving 2 g. of the sodium salt of p-(1,4,5,6,7,7-hexachlorobicyclo[2.2.1]-5-hepten-2-yl)benzenesulfonic acid in 200 cc. of water. This solution was sprayed into a cage containing common houseflies. At the end of 24 hours there was recorded a 96% kill of the flies.

We claim as our invention:

1. An insecticidal composition comprising an aqueous solution of p-(1,4,5,6,7,7-hexachlorobicyclo[2.2.1]-5-hepten-2-yl)benzenesulfonic acid.

2. An insecticidal composition comprising an aqueous solution of the sodium salt of p-(1,4,5,6,7,7-hexachlorobicyclo[2.2.1]-5-hepten-2-yl)benzenesulfonic acid.

References Cited in the file of this patent

UNITED STATES PATENTS

| | | |
|---|---|---|
| 2,573,675 | Bloch et al. | Nov. 6, 1951 |
| 2,606,910 | Herzfeld et al. | Aug. 12, 1952 |
| 2,676,185 | Melstrom et al. | Apr. 20, 1954 |
| 2,712,030 | Polen | June 28, 1955 |

OTHER REFERENCES

Groggins: Unit Processes in Organic Synthesis, pp. 267, 268, 296–297 (1952).